Oct. 20, 1970   R. A. HEINZEN   3,535,571
SYNCHRONOUS MOTOR WITH MAGNETICALLY SPLIT POLE PIECES AND
PERMANENT MAGNET ROTOR
Filed Feb. 5, 1969
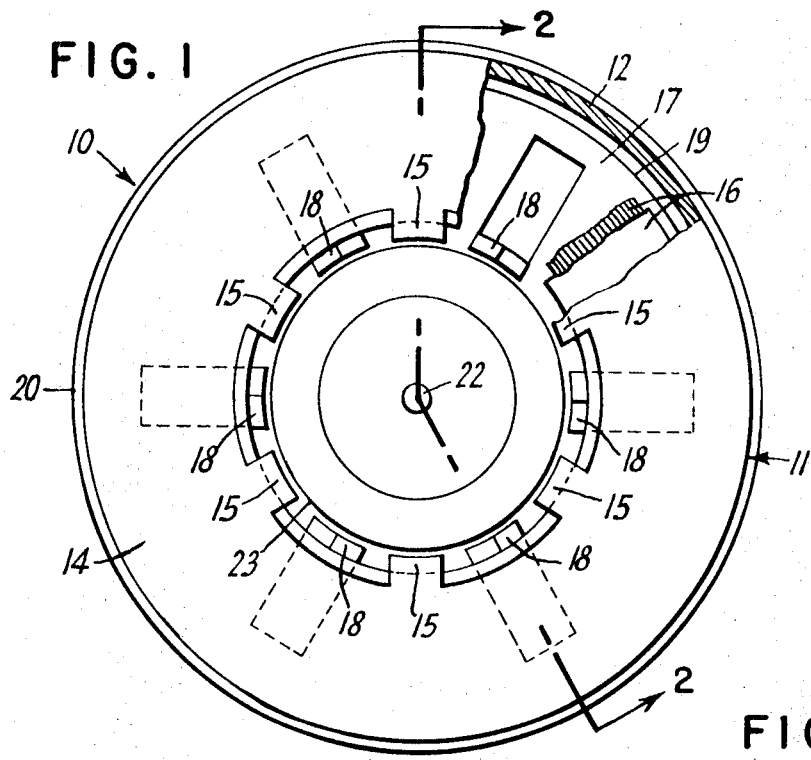
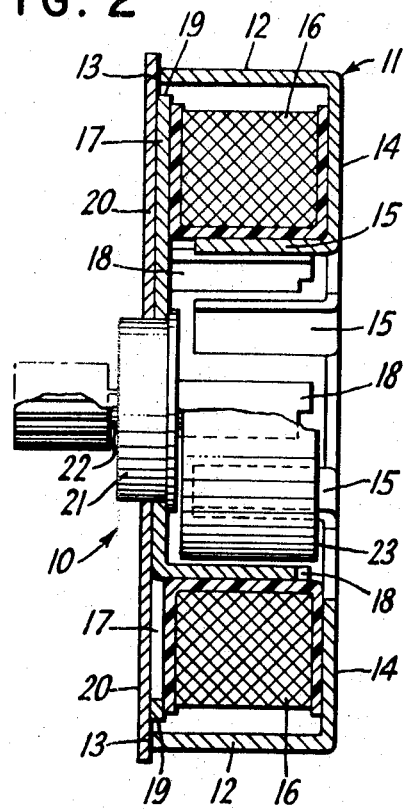
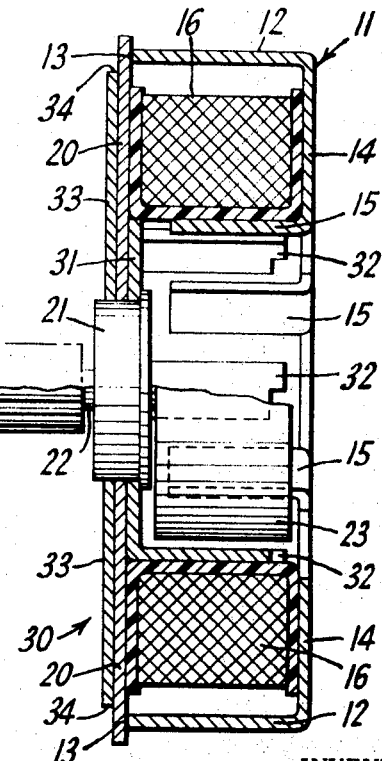
INVENTOR.
ROBERT A. HEINZEN
BY Charles J. Worth
AGENT

United States Patent Office 3,535,571
Patented Oct. 20, 1970

3,535,571
SYNCHRONOUS MOTOR WITH MAGNETICALLY SPLIT POLE PIECES AND PERMANENT MAGNET ROTOR
Robert A. Heinzen, Manitowoc, Wis., assignor to American Machine & Foundry Company, a corporation of New Jersey
Filed Feb. 5, 1969, Ser. No. 796,701
Int. Cl. H02k 23/64
U.S. Cl. 310—158
9 Claims

ABSTRACT OF THE DISCLOSURE

A synchronous A.C. motor having a permanent magnet rotor, two stator pole piece members, a stator flux path including the pole piece members and air gap members providing a decoupling reluctance in the stator flux path when the motor is quiescent.

---

This invention relates generally to synchronous clock or timer motors and more particularly to such motors which are A.C. energized and have permanent magnet rotors.

Synchronous A.C. motors of this type having one or two pole pieces each providing a set of salient stator poles is not new in the art. It has been heretofore realized that a motor of this type with two pole pieces will have a greater running torque output than will a corresponding motor with only one pole piece. On the other hand, the motor with only one pole piece has a starting advantage over a corresponding motor with two pole pieces. There have been many and varied modifications proposed for both one and two pole piece motors in an effort to derive the benefits of both forms of motors. While a number of these proposals attained some degree of operating success, higher costs, new difficulties in manufacture and increased malfunctions were usually incurred.

Accordingly, an object of the present invention is to provide a reliable synchronous A.C. motor with a permanent magnet rotor and two pole pieces which has the starting advantages of a single pole piece motor.

Another object of the present invention is to provide the foregoing motor which can be made with substantially no additional cost or difficulty over that incurred in manufacturing a similar two pole piece motor without such starting capabilities.

And, another object of the present invention is to provide the foregoing motor in which the stator flux path includes means for substantially magnetically uncoupling the pole pieces from each other when the motor is quiescent.

The present invention contemplates a synchronous A.C. motor comprising annular coil means, pole piece means disposed at both ends of the coil means each providing a plurality of salient stator poles extending axially toward the other of the pole piece means, the salient stator poles of each of the pole piece means alternating with the salient stator poles of the other of the pole piece means in equally spaced annular series within the coil means, rotor means disposed within the series of salient stator poles and having a permanent magnet face at its periphery providing a plurality of pole areas of substantially equal size and being equal in number to the salient stator poles, each of the pole areas being of a polarity opposite to the polarity of the adjacent pole area, means including the pole piece means providing a stator flux path between the salient poles of the pole piece means, and means for providing a reluctance in stator flux path.

The foregoing and other objects and advantages will appear more fully hereinafter from a consideration of the detailed description which follows, taken together with the accompanying drawing wherein several embodiments of the invention are illustrated by way of example. It is to be expressly understood, however, that the drawings are for illustration purposes only and are not to be construed as defining the limits of the invention.

FIG. 1 is an end elevational view of a motor made in accordance with the present invention, and having portions thereof broken away for a more adequate disclosure, FIG. 2 is a sectional view taken on line 2—2 of FIG. 1, and FIG. 3 is a view, similar to FIG. 2, of another form of motor made in accordance with the present invention.

Referring now to the drawings and particularly to FIGS. 1 and 2, a motor 10 made in accordance with the present invention is provided with a cover 11, of magnetic material, having an annular wall 12 which is open at one end 13 and is closed at its other end by a wall 14. Since the cover 11 is made of a magnetic material, a plurality of axially extending salient stator poles 15 are struck from the end wall 14 and are disposed in equally spaced annular series coaxial with and within the annular wall 12.

An annular coil 16, provided within the annular wall 12, encircles the salient poles 15 and at one end is adjacent the end wall 14. If it is desired to completely close one end of the motor 10 with the cover 11, a suitable cap (not shown) may be connected to the end wall 14 or, alternatively, the end wall can be left unbroken and a separate pole piece (not shown) with the salient poles 15 may be provided between the end wall 14 and the adjacent end of the coil 16.

A pole piece 17 is provided adjacent the other end of the coil 16 opposite from the end wall 14 and has a plurality of axially extending stator poles 18 disposed in equally spaced annular series within the coil. The salient stator poles 15 and 18, which extend axially from opposite ends of the motor 10 are interleaved between or alternate in series with one another. Therefore, when the coil 16 is A.C. energized, all of each series or set of salient poles 15 and 18 will be of the same instantaneous polarity and opposite to the instantaneous polarity of the other series or set of salient poles.

The edge 13 of the annular wall 12 is staked or otherwise connected by any suitable means well known in the art to a plate 20 of nonmagnetic material for closing the other end of the motor 10 opposite from the end wall 14 of the cover 11. The nonmagnetic plate 20 has a central opening to mount a bearing means 21 for rotatably supporting a shaft 22 of a permanent magnet rotor 23 which is encircled by the salient stator poles 15 and 18.

The rotor 23 may be of any suitable construction having a permanent magnet face at its periphery in spaced face to face alignment with the annular series of salient stator poles 15 and 18. The permanent magnet rotor faces is magnetically segmented into a plurality of pole areas of substantially equal size and equal in number to the number of salient stator poles 15 and 18. Each of the rotor pole areas is of a polarity opposite to the polarity of the adjacent pole area in the usual manner.

The pole piece 17 is mounted on the bearing means 21, inwardly of the nonmagnetic plate 20 with its outer periphery 19 spaced radially inwardly from the edge 13 of the annular wall 12 thereby forming an annular air gap therebetween.

In the usual permanent magnet motor having two pole pieces, the rotor will assume a position in which each of the rotor pole areas is disposed in face to face alignment with a salient stator pole.

However, in accordance with the present invention, the annular air gap formed by the periphery 19 of the pole piece 17 and the end 13 of the annular cover wall 12 provides a reluctance in the stator flux path between the salient poles 15 and the salient poles 18. As a result, the motor 10, in quiescence, reacts as a motor with a single set of salient stator poles. Accordingly, the rotor 23 assumes a position in which each of the salient poles 15 and 18 laps an adjacent pair of pole areas of the rotor face. Although the ends of only the salient stator poles 18 are shown as being notched to improve starting as taught by my Pat. 3,164,734 which issued Jan. 5, 1965, either one or both of the sets or series of poles 15 and 18 may be so notched.

A modified motor 30, made in accordance with the present invention, is shown in FIG. 3 as being substantially similar to motor 10. However, in this instance, a pole piece 31 is provided which is similar to the pole piece of the aforementioned Pat. 3,164,734 to replace the pole piece 18 and is fully enclosed within the coil 16. The pole piece 31 is provided with a series or set of salient poles 32 corresponding to the poles 18.

To complete the stator flux path of the motor 30, a plate 33 of magnetic material is mounted outwardly of the nonmagnetic plate 20 on the bearing means 22. The outer wall of the bearing means 22 is required to be of a magnetic material to magnetically couple the pole piece 31 and the plate 33. The periphery 34 of the plate 33 is spaced radially inwardly from or is of smaller diameter than the annular wall 12 and is axially spaced from the wall edge 13 to form an annular air gap therebetween. The annular air gap of motor 30 formed between the periphery 34 of plate 33 and the edge 13 of the annular wall 12 corresponds to the annular air gap of motor 10 formed between the periphery 19 of pole piece 17 and the edge 13 of the annular wall 12. In the motor 30, however, the nonmagnetic plate 20 extends through the annular air gap.

It now should be fully understood that a synchronous A.C. permanent magnet motor 10 or 30, made in accordance with the present invention, enjoys the torque output benefits of a two pole piece motor while realizing the starting advantages of a single pole piece motor.

Although but several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a synchronous A.C. motor, a combination comprising
   annular coil means,
   pole piece means disposed at both ends of said coil means each providing a plurality of salient stator poles extending axially toward the other of said pole piece means,
   said salient stator poles of each of said pole piece means alternating with said salient stator poles of the other of said pole piece means in equally spaced annular series within said coil means,
   rotor means disposed within said series of salient stator poles and having a permanent magnet face at its periphery providing a plurality of pole areas of substantially equal size and equal in number to said salient stator poles,
   each of said pole areas being of a polarity opposite to the polarity of the adjacent pole areas,
   means including said pole piece means providing a stator flux path between said salient poles of said pole piece means, and
   means for providing a reluctance in said stator flux path.

2. The synchronous A.C. motor in accordance with claim 1 wherein
   said pole piece means at one end of said coil means including a cover of magnetic material having an end wall and an annular wall encircling said coil means,
   said annular wall being close at one end by said end wall and being open at its other end,
   said pole piece means at the other end of said coil means having its outer periphery spaced radially inwardly from the open end of said annular wall thereby defining an annular air gap providing the reluctance in said stator flux path.

3. The synchronous A.C. motor in accordance with claim 2 and
   said end wall being cut and formed to provide said salient stator poles of said pole piece means at said one end of said coil means.

4. The synchronous A.C. motor in accordance with claim 2 and
   a plate member of nonmagnetic material connected to and closing the open end of said annular wall,
   said rotor means including a shaft and bearing means rotatably supporting said shaft,
   and said bearing means extending through said plate member and said pole piece means at said other end of said coil means thereby being supported by said plate member and supporting said pole piece means through which it extends.

5. The synchronous A.C. motor in accordance with claim 4 wherein said pole piece means at said other end of said coil means including
   a disc member of magnetic material providing said salient stator poles thereof and said outer periphery spaced radially inwardly from said open end of said annular wall, and
   said disc member being disposed between said plate member and said annular coil means.

6. The synchronous A.C. motor in accordance with claim 5 and
   said end wall being cut and formed to provide said salient stator poles of said pole piece means at said one end of said coil means.

7. The synchronous A.C. motor in accordance with claim 4 wherein said pole piece means at said one end of said coil means including
   a pole piece member of magnetic material providing said salient stator poles thereof and being encircled by said annular coil means,
   a disc member of magnetic material disposed on the side of said plate member opposite from said pole piece member and providing said outer periphery spaced radially inwardly from said open end of said annular wall, and
   means for magnetically coupling said pole piece and disc members.

8. The synchronous A.C. motor in accordance with claim 7 and
   said bearing means extending through said pole piece and disc members and having an outer wall of magnetic material in contact with said members thereby providing said magnetic coupling means.

9. The synchronous A.C. motor in accordance with claim 8 and said end wall being cut and formed to provide said salient stator poles of said pole piece means at said one end of said coil means.

References Cited
UNITED STATES PATENTS

| | | | |
|---|---|---|---|
| 2,212,782 | 8/1940 | Lauffer | 310—163 |
| 3,113,231 | 12/1963 | Haydon | 310—163 |
| 3,149,256 | 9/1964 | Kohlhagen | 310—156 |
| 3,268,751 | 8/1966 | Nebiolo | 310—156 |
| 3,330,975 | 7/1967 | Osterwalder | 310—164 |

WARREN E. RAY, Primary Examiner

R. SKUDY, Assistant Examiner

U.S. Cl. X.R.

310—164, 257, 266